(12) United States Patent  
Vance

(10) Patent No.: US 7,593,389 B2
(45) Date of Patent: Sep. 22, 2009

(54) DISTINCTIVE DIAL TONE FOR A VOIP CALL

(75) Inventor: William Hume Vance, Somerville, MA (US)

(73) Assignee: Zoom Telephonics, Inc., Boston, MA (US)

( * ) Notice: Subject to any disclaimer, the term of this patent is extended or adjusted under 35 U.S.C. 154(b) by 983 days.

(21) Appl. No.: 10/934,787

(22) Filed: Sep. 3, 2004

(65) Prior Publication Data

US 2006/0050682 A1 Mar. 9, 2006

(51) Int. Cl.
*H04L 12/66* (2006.01)
(52) U.S. Cl. ...................... 370/352; 370/354
(58) Field of Classification Search ............ 370/352
See application file for complete search history.

(56) References Cited

U.S. PATENT DOCUMENTS

| 5,361,296 | A | 11/1994 | Reyes et al. |
| 6,091,721 | A | 7/2000 | Greenberg et al. |
| 6,614,786 | B1 | 9/2003 | Byers |
| 6,766,162 | B1* | 7/2004 | Beamish .................. 455/412.1 |
| 2001/0024436 | A1 | 9/2001 | Barraclough et al. |
| 2003/0016807 | A1* | 1/2003 | Otsuka ........................ 379/219 |
| 2003/0053446 | A1* | 3/2003 | Kwon .......................... 370/352 |
| 2005/0047402 | A1* | 3/2005 | Bostrom et al. ............. 370/354 |
| 2005/0073995 | A1* | 4/2005 | Yeh et al. .................... 370/352 |
| 2006/0039290 | A1* | 2/2006 | Roden et al. ................ 370/241 |

\* cited by examiner

*Primary Examiner*—Creighton Smith
(74) *Attorney, Agent, or Firm*—Hamilton, Brook, Smith & Reynolds, P.C.

(57) ABSTRACT

A VoIP analog telephone adapter coupled to a telephone allows a telephone call to be made over the Public Switched Telephone Network (PSTN) or over the Internet. Prior to dialing a phone number, with the telephone "off-hook", a caller receives an audible indication as to whether the call will be made over the PSTN or the Internet through a standard dial tone generated by a Central Office or a distinctive dial tone generated by the adapter. The distinctive dial tone is different from the PSTN's dial tone.

41 Claims, 6 Drawing Sheets

Voice over IP

| Item | | Status |
|---|---|---|
| Registration Status | 602 | 0 |
| User ID | 604 | |
| Auto-Configuration Status | 606 | AutoConfigureActive |
| World Wide Number | 608 | 0 |

Basic Setup

610 Auto Account Configuration  Select Tone & Ring by Country Region

Server [          ]  [US/Canada - VOIP ▽] 620

612 Filename [          ]  Display Name — 618

614 Encryption ☐ 616  [          ]

622  VoIP only Mode: ☐
[Download Configuration Now]  624

[Save Changes]

[Write Setting to Flash and Reboot]

FIG. 6

DISTINCTIVE DIAL TONE FOR A VOIP CALL

BACKGROUND OF THE INVENTION

Real-time audio, such as a telephone conversation between two people using telephones, may be transmitted over a packet network such as the Internet using Voice over Internet Protocol ("VoIP"). VoIP may be used instead of transmitting the telephone conversation over a Public Switched Telephone Network (PSTN) connection in order to take advantage of expanded service offerings and/or to eliminate or reduce charges for a long distance telephone call.

To transmit the real-time audio over the packet network, a packet transmitter in a source Internet node encodes the analog voice signal, loads the encoded data in the payload of one or more data packets, and transmits the data packets over the packet network.

In a system in which real-time audio can be directed over a packet network or a telephone network, a caller can select the method of transmission. The caller may want to select the method of transmission based on cost, features, or quality of the call. VoIP calls typically offer lower cost; although this may not be the case, for example, if the caller has an unlimited calling plan on a PSTN connection. A VoIP service typically offers more premium features than a PSTN service, such as real-time availability of call logging information. Call quality may suffer from time to time on a VoIP connection, such as when there is high Internet traffic. Conversely, in many situations VoIP call quality is superior to that available through a PSTN connection. This is often the case for international calls, where the cost advantages for VoIP are typically greatest.

SUMMARY OF THE INVENTION

To make a call—that is, establish a connection over a network to another device—the caller typically first puts the telephone unit in the "off-hook" state by lifting the handset from the telephone unit or selecting the "off-hook" button in a speakerphone unit. Upon detecting the "off-hook" condition, a Central Office (CO) transmits a dial tone to the telephone unit. While the telephone is 'off-hook' prior to making the call, the dial tone can be heard by the caller through a speaker of a telephone connected to the PSTN. This dial tone indicates that the telephone network is available and that the caller can request a connection to another device; that is, the system is ready for dialing. Thus, callers are accustomed to receiving the dial tone from the Central Office indicating that the PSTN line is working and ready for the caller to make a call. However, when the packet network is selected, no dial tone is received from the central office because there is no connection between the telephone and the Central Office.

According to the present invention, when the packet network is selected for making a call, a caller receives a distinctive dial tone prior to making a call indicating that the connection will be established over a packet network. The distinctive dial tone provides an audible indication to the caller that the caller is not calling through the PSTN, and that the packet network is available. The caller can decide whether to proceed to make the call over the packet network.

An analog telephone adapter includes circuitry that includes a tone generator. The adapter also includes circuitry that encodes an analog voice signal into a digital packet for transmission over a packet network. The tone generator, responsive to an off-hook condition, generates a distinctive dial tone indicating that a connection will be directed to the packet network.

In one embodiment, other circuitry directs a request for establishing the connection received from a telephone coupled to the adapter to a telephone network or to the packet network. A portion of the device's non-volatile (FLASH) memory is designated as configuration memory. This configuration memory stores data that the device refers to when it makes certain decisions. One such decision is whether to direct a request to establish a telephone connection over a telephone network or over a packet network.

The configuration memory may be modified by a configuration manager in the adapter. The configuration manager may be an HTTP server or an Interactive Voice Response (IVR) system or some other mechanism in the device. The user may access the configuration manager through a web-browser, in the case of the HTTP server, through an attached telephone, in the case of the IVR, or through some other means. By these means, the user sets data in the configuration memory that specifies whether the circuitry should direct the request to the telephone network or to the packet network.

The circuitry directs the connection to the packet network upon detecting a suitable signal from the telephone, and otherwise directs the connection to the telephone network. The tone generator generates the distinctive dial tone upon detection of the suitable signal. The signal may be the DTMF tone # from the telephone, as the first DTMF tone detected after detection of an off-hook condition.

In one embodiment, the circuitry may direct all call requests to the packet network. The distinctive dial tone may have a single frequency or at least two frequencies, and may be continuous or discontinuous. The adapter may connect to a phone line that provides DSL service. In an alternate embodiment, the packet network may be the Internet.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a page displayed on the monitor of the computer for configuring VoIP in the adapter 100 shown in FIG. 1.

DETAILED DESCRIPTION OF THE INVENTION

A description of preferred embodiments of the invention follows.

Figure 1:
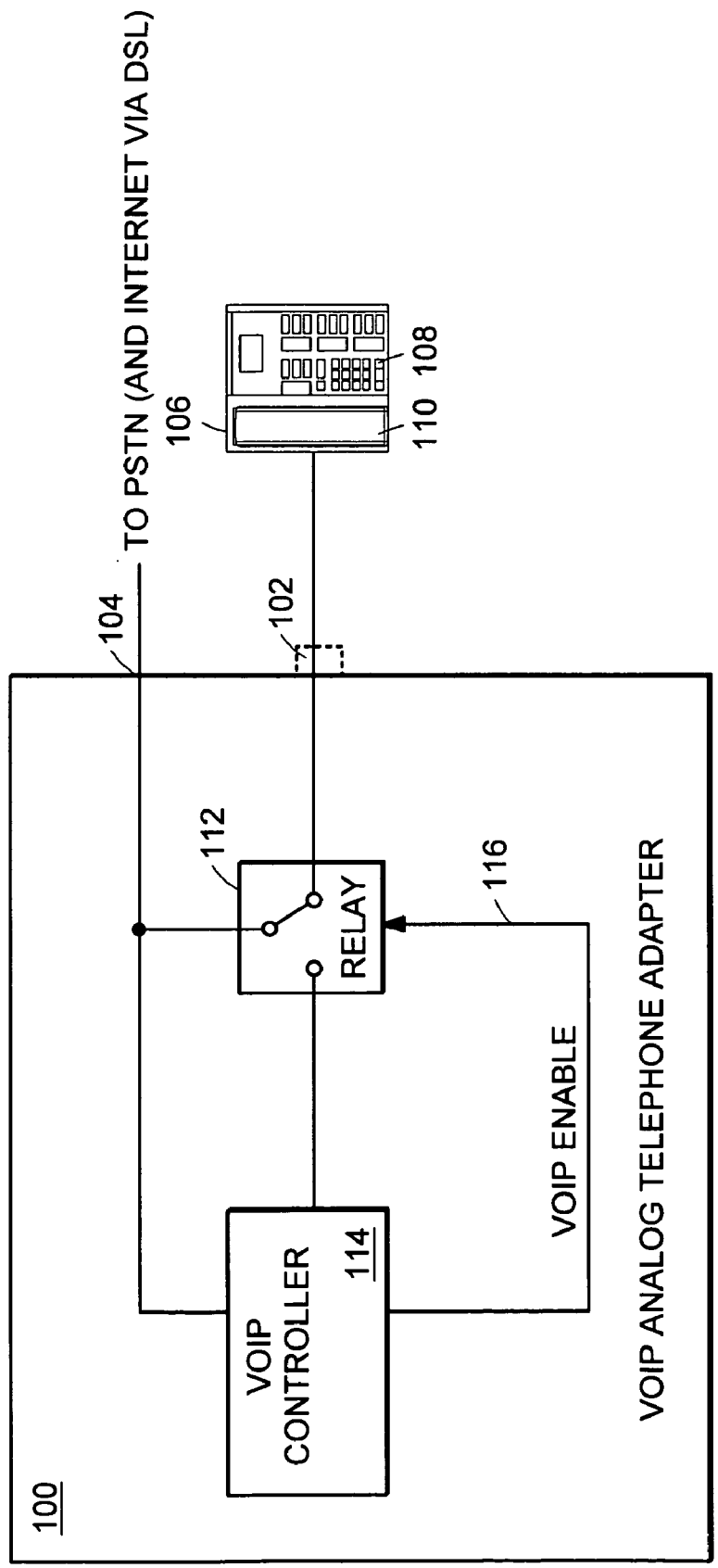
FIG. 1 is a block diagram of a VoIP analog telephone adapter according to the principles of the present invention.

FIG. 1 is a block diagram of a Voice over Internet Protocol (VoIP) analog telephone adapter 100 according to the principles of the present invention. In one embodiment, the VoIP analog telephone adapter 100 includes a phone port 102 for connecting to a conventional telephone 106 and a telephone line 104 for connecting to the Public Switched Telephone Network (PSTN). The telephone line may also provide a Digital Subscriber Line (DSL) connection that provides connectivity to the Internet. An alternative embodiment described later in conjunction with FIG. 4 uses an Ethernet port for connecting to the Internet via an Ethernet connection to a DSL, cable or other Internet device. Another alternative embodiment includes a cable modem. Yet, another alternative embodiment includes an analog modem.

As is well-known in the art, a conventional telephone 106 typically includes a touch tone keypad 108, and a handset 110 having a speaker and microphone. A tone generator in the telephone 106 generates a different Dual Tone Multi Frequency (DTMF) signal for each key on the keypad 108. For example, the DTMF signal (tone) generated for the '#' key is comprised of two frequencies 941 Hz and 1,477 Hz.

The microphone in the handset of the telephone receives an analog signal (audio) that is transmitted to the adapter. The audio transmitted to the adapter from the microphone may include speech, other sounds, and/or background noise.

In one embodiment, the VoIP analog telephone adapter 100 includes a relay 112 that allows the telephone 106 to be connected to the PSTN or to be connected through the VoIP controller 114. Reasons for selecting one type of call over another include cost, convenience and quality. VoIP calls are typically less expensive than PSTN calls. Often local calls over the PSTN are free and it may make sense to make some or all local calls over the PSTN for this reason. Sometimes the quality of a VoIP connection is superior to that of a PSTN call, for example, for many international calls. Furthermore, callers may prefer to make calls using VoIP, because of superior and easily accessible call log records or other features.

The relay is selected to connect telephone 106 to the PSTN when there is no power to the adapter, to allow calls to be made directly over the PSTN. In one embodiment, the relay is also selected to connect the telephone to the PSTN after the adapter is initially powered-on and at the end of each call, unless the adapter has been configured for VoIP only mode.

The relay 112 is selected to connect the telephone to the VoIP controller 114 if the adapter has been configured for a VoIP call. VoIP, also referred to as Internet Telephony, delivers digitized audio in packet form over a packet network using the Internet Protocol (IP). The state of the VoIP enable signal 116 controlled by the VoIP controller 114 controls the state of the relay 112. The VoIP controller 114 converts the analog signal received from the telephone into a digital signal, packetizes the digital signal, and sends the packetized digital signal to the Internet. The packets are passed over the Internet, finally reaching the intended party or a PSTN gateway where they are converted back to an analog signal.

In the embodiment of the adapter shown in FIG. 1, the PSTN line may be ADSL enabled, allowing both data and voice traffic to be transmitted over the same wire. While the analog signal received from the telephone 106 is being sent over the data portion of the ADSL-enabled telephone line, another analog signal can be transmitted from other phones connected to the PSTN line; that is, the audio portion of the ADSL-enabled line remains open for calls originating and terminating in other telephones connected to the same PSTN line. In an alternate embodiment described in conjunction with FIG. 4, the voice traffic can be transmitted over an IP network using a cable modem.

When the adapter is set to VoIP mode, a caller can make a VoIP call to a subscriber of a VoIP service by using the other subscriber's VoIP number. For example, the VoIP service may be the Global Village VoIP service provided by Zoom Telephonics, Inc. Subscribers to this service are assigned unique VoIP numbers, currently 7 digits. VoIP calls can also be made using other service providers, by dialing a "1" followed by the callee's VoIP number.

To make a call, the caller typically lifts the handset 110 from the telephone 106. If the telephone is connected through the relay 112 to the PSTN, a Central Office (CO) connected to the PSTN transmits a dial tone to the telephone 106 upon detecting that the telephone is "off-hook". The dial tone is a sound comprising one or more frequencies, most commonly two in the United States. While the telephone is 'off-hook', the dial tone can be heard by the caller through the speaker of the telephone. This dial tone indicates that the PSTN is available and that the caller can make a call over the PSTN. A "Dial tone" can be a continuous dial tone (standard dial tone), or discontinuous (stutter) dial tone indicating that a voice message is waiting, or that call forwarding is active. The term dial tone as used herein applies to any other variant such as recall dial tone and confirm tone.

In VoIP mode, the telephone 106 is connected through the relay 112 to the VoIP controller 112. Upon detecting that the handset is "off-hook", the VoIP controller transmits a distinctive dial tone to the telephone. While the telephone is 'off-hook', the distinctive dial tone can be heard by the caller through the speaker of the telephone. This distinctive dial tone indicates that the telephone call will be placed over the Internet. Thus, the caller is provided an audible indication prior to making the call. The distinctive dial tone is different from the telephone network's standard dial tone. For example, in one embodiment, the frequencies 350, 416 selected for the distinctive dial tone for the US differ from the frequencies 350, 440 selected for the standard dual-tone dial tone in the US.

Preferably, the distinctive dial tone is chosen to both have a pleasing tone and to be easily distinguished from the standard dial tone. The standard PSTN and distinctive dial tones typically used for different countries are shown in Table 1 below:

TABLE 1

| Standard/Country/Region | Standard Freq. (Hz) | Distinctive Freq. (Hz) |
|---|---|---|
| US/Canada | 350, 440 | 350, 416 |
| UK | 350, 440 | 350, 416 |
| ITU/Europe | 425 | 357 |

In the case of the standard dual-tone dial tone used in the US/Canada and United Kingdom, the frequencies (350,440) constitute a major third. The major third is the relationship between the first note and the third note in a major scale. In the embodiment shown in Table 1, the frequencies (350,416) that are selected for the distinctive dual-tone dial tone for US/Canada and the United Kingdom constitute a minor third. The minor third is the relationship between the frequency of a first tone and the third tone in a minor scale.

A single frequency dial tone is typically used as the standard dial tone in other countries. In one embodiment, the distinctive dial tone is selected by lowering the pitch by a minor third from the standard frequency. For example, the distinctive single tone dial tone is 357 Hz in Europe lowered by a minor third from the standard 425 Hz dial tone frequency.

Figure 2:
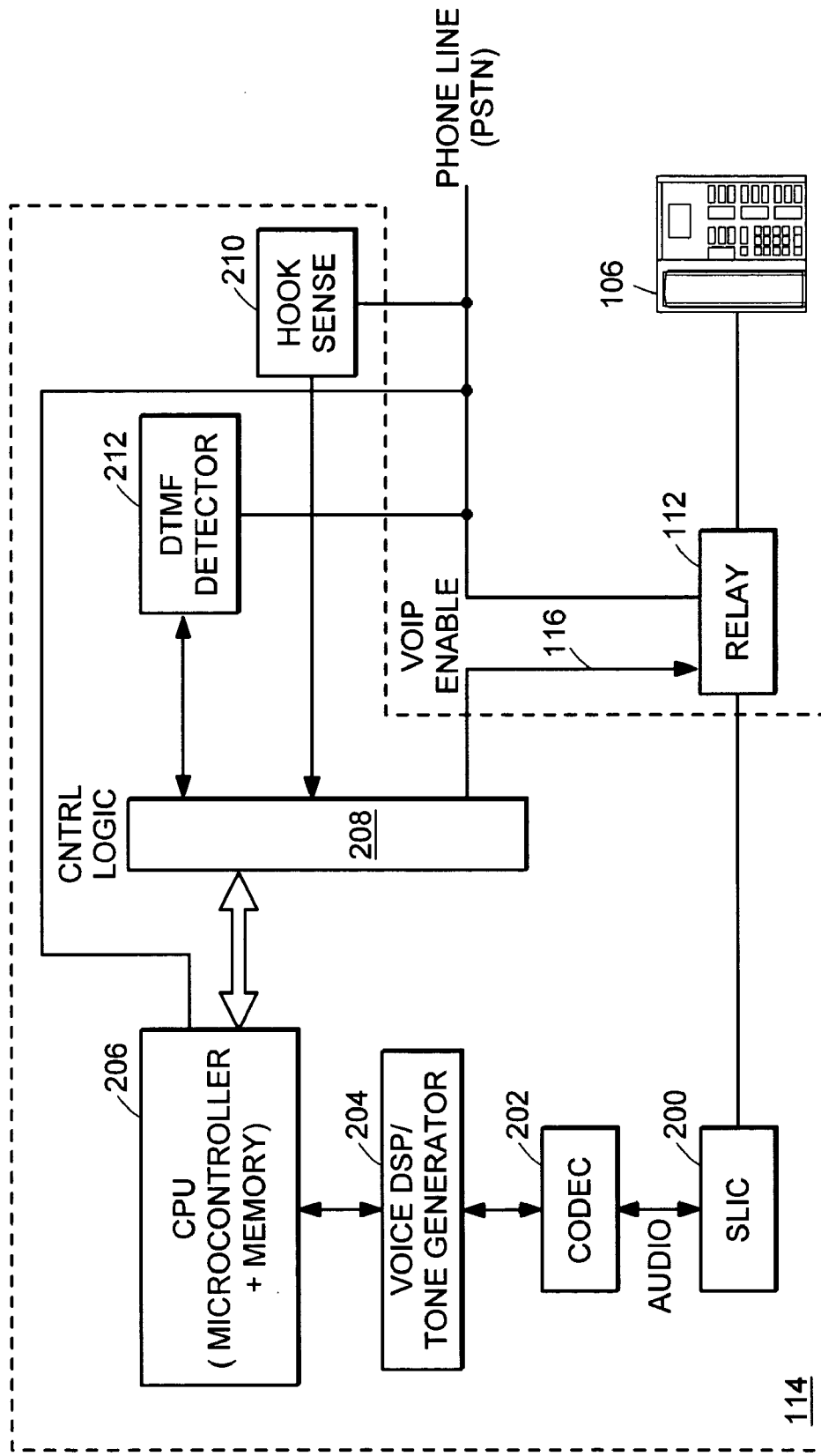
FIG. 2 is a block diagram of the VoIP controller in the VoIP analog telephone adapter shown in FIG. 1.

FIG. 2 is a block diagram of the VoIP controller 114 shown in FIG. 1. The VoIP controller 114 includes a Subscriber Line Interface Circuit (SLIC) 200. The SLIC 200 provides telephone interface functionality similar to the Central Office on a PSTN to the local telephone 106. A tone generator 204 coupled through a CODEC 202 to the SLIC includes voice encoding logic for encoding the audio prior to transmitting it in the payload of packets. The tone generator 204 also includes voice decoding logic for decoding and converting received packets from the remote party (callee) to audio signals.

Control logic (circuitry) 208 controls a DTMF detector 210, a hook sense detector 212 and the state of the PSTN relay 112. The control logic 208 is coupled to a CPU module 206 that includes a micro-controller and memory (volatile and non-volatile). The non-volatile memory, such as Flash memory, stores an image of the instruction code for the microcontroller, as well as configuration data for the adapter, such as whether the adapter has been configured in VoIP only mode. The volatile memory can be Synchronous Dynamic Random Access Memory that at run-time contains instruction code for execution by the microcontroller together with data and data buffers that are required for operation of the controller. The instruction code can include a configuration manager that determines whether the circuitry directs a request for establishing a connection to the telephone network or the packet network. The configuration manager can be implemented as a web-server, an Interactive Voice Response (IVR) or some other mechanism in the adapter. The IVR is an automated system that prompts a caller to select a touch tone key in order to request a particular function. An IVR can also interpret voice.

The user can access the configuration manager through a web-browser, in the case of a HTTP server, through an attached telephone, in the case of the IVR, or through some other means. By means of the configuration manager, the user can set the adapter to one of the following modes: (1) always direct calls to the packet network; (2) direct calls to the packet network only if the first digit dialed is a '#' or (3) direct calls to the telephone network only if the first digit dialed is a '#'.

The DTMF detector 210 is able to detect DTMF tones generated by the telephone 106 when the telephone 106 is connected to the PSTN through the relay 112. When the "hook sense" detector 210 detects an "off-hook" condition, the VoIP controller examines the first DTMF tone that the caller subsequently enters. Upon detecting the first DTMF tone corresponding to the # key on the keypad of the telephone 106, the DTMF detector 210 signals the control logic 208 to change the state of the VoIP Enable signal 116 to enable VoIP mode.

The tone generator 204 generates the distinctive dial tone upon detecting that the adapter 100 has been switched to VoIP mode after the tone for the # key has been detected, or upon detecting that the telephone is "off-hook" through the "hook sense" capability of the SLIC 200 if the adapter has been configured in VoIP-only mode. The distinctive dial tone (dual or single frequency) is generated by the tone generator 204 which can be a Digital Signal Processor (DSP) and carried through the SLIC 200 and PSTN relay 112 to the telephone 106. Although a DSP is used to generate the distinctive dial tone in this embodiment, the distinctive dial tone can be generated by other tone generator circuitry as is well known to those skilled in the art.

Figure 3:
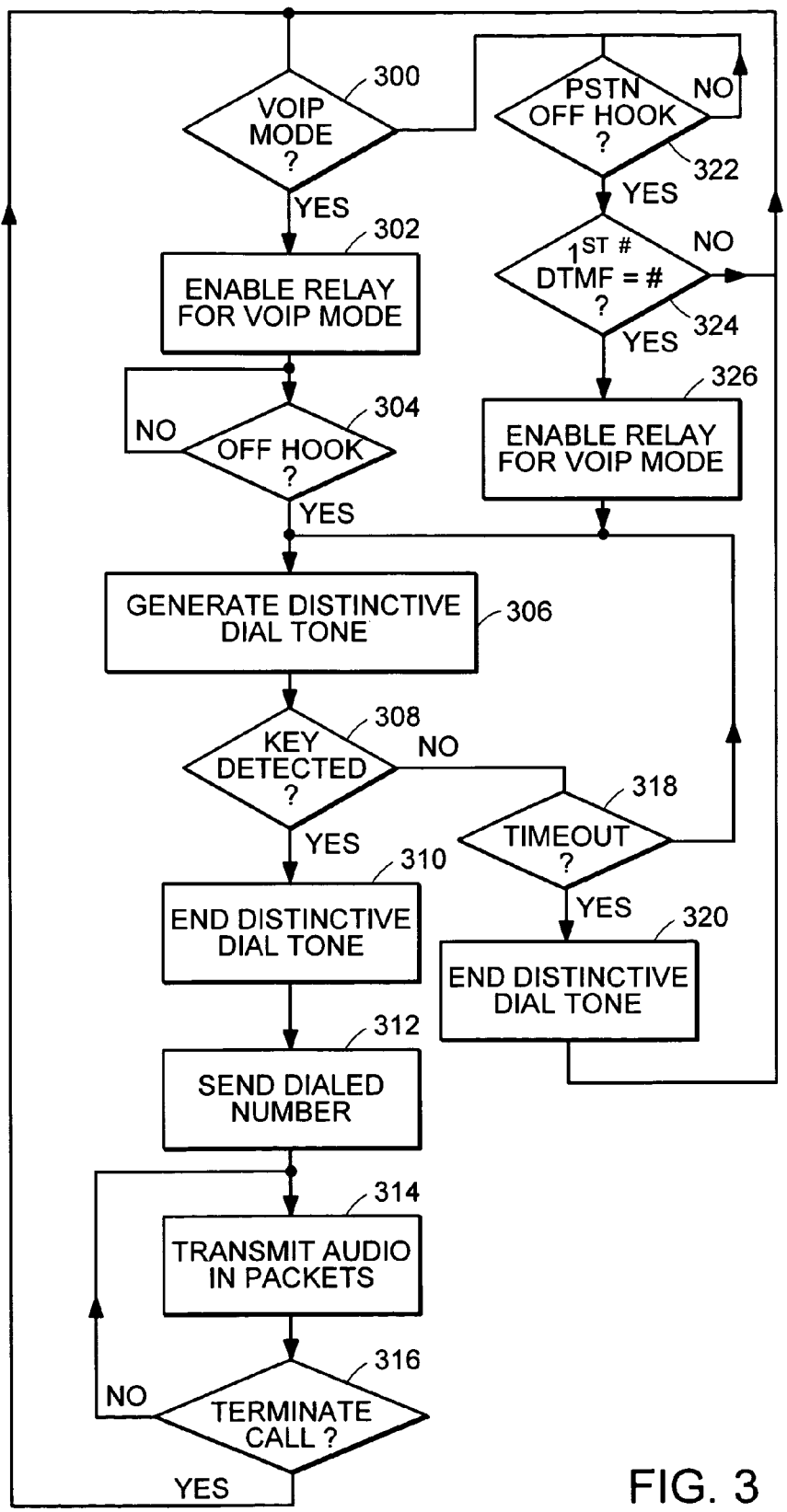
FIG. 3 is a flow chart illustrating the method implemented in the adapter shown in FIG. 2 for selecting whether a call is made over the PSTN or the Internet.

FIG. 3 is a flow chart illustrating a method implemented in the adapter shown in FIG. 2 selecting whether a call is made over the PSTN or the Internet.

There are two ways to set the adapter to VoIP mode: (1) Prior to making a call, a caller can request that the call be sent over the Internet—for instance by initially dialing a number after coming off-hook; or (2) The adapter can be configured so that all calls are made over the Internet; that is, VoIP-only mode, via a configuration manager. The configuration manager is discussed later in conjunction with FIGS. 5 and 6.

At step 300, a microcontroller in the VoIP controller 114 determines whether the adapter is in VoIP-only mode. If the adapter is not in VoIP-only mode, the local telephone is connected through the relay 112 to the PSTN. If the caller lifts the handset from the telephone in order to make a call, the telephone is "off-hook", that is, connected through the relay 112 to the central office. The central office detects that the telephone is "off-hook" and sends a dial tone to the telephone. The dial tone sent is typically dependent on the country in which the central office is located. The dial tone can be heard through the receiver (speaker) of the telephone.

At step 322, the microcontroller detects that VoIP mode has not been previously selected. Then at step 322, the hook-sense detector senses a PSTN "off-hook" condition. Prior to making a call, the caller indicates that the connection is to be established over a data packet network, such as the Internet, typically by pressing a key on the keypad of the telephone. In one embodiment, the "#" key is used to select a VoIP call.

If the hook sense detector senses PSTN off-hook, then at step 324, the Dual Tone Multi-Frequency (DTMF) detector in the adapter detects that the '#' key has been pressed as the first key after the off-hook event. At step 326, the relay is enabled for VoIP mode.

If, at step 300, the microcontroller detects that VoIP mode has been selected by prior configuration, then at step 302, the adapter is switched to VoIP-enable mode by the control logic 208 by setting the state of the VoIP-enable signal 116 (FIG. 1). The telephone 106 is coupled through the relay 112 to the SLIC 200 in the VoIP controller 114. The SLIC 200 has some similar functions to the Central Office connected to the PSTN.

At step 304, after the local telephone has been switched through the relay to the SLIC 200, the VoIP controller 114 in the adapter 100 is alerted that the telephone 106 is now connected to the SLIC 200. The microcontroller 206 through the SLIC 200 checks if the telephone 106 is "off-hook".

At step 306, the telephone 106 is "off-hook", and the microcontroller directs the tone generator 204 to generate a distinctive dial tone indicating that the telephone 106 is connected through the relay 112 to the SLIC 200 and a VoIP call can be made. The distinctive dial tone is directed through the SLIC 200 to the telephone 106. The tone generator 204 continues to generate the distinctive dial tone while waiting for the caller to press another key on the keypad of the telephone. The distinctive dial tone can be continuous or non-continuous, that is, a stutter dial tone.

At step 308, the tone generator waits to detect another DTMF tone from the telephone indicating that a key on the keypad of the telephone has been pressed. If at step 318, a DTMF tone has not been detected after a timeout period has elapsed, then at step 320, the generation of the distinctive dial tone is typically terminated. The timeout period is typically 15 seconds. At this time a receiver off-hook (ROH) signal is typically sent to the telephone.

At step 310, after the first DTMF tone (representing the first digit of the phone number) is detected by the tone generator, the generation of the distinctive dial tone is terminated.

At step 312, the first DTMF tone and subsequent DTMF tones representing the telephone number to which the caller wants to connect are examined relative to a dial plan. The dial plan relates particular sequences of digits, number of digits and time since the last digit was dialed to determine when to send the collected digits to a VoIP server or endpoint. A VoIP server may be a Session Initiation Protocol (SIP) server. The Session Initiation Protocol is a signaling protocol for Internet conferencing, telephony, multi-media distributions, presence, events notification and instant messaging. In this case, the dialed number is sent in a SIP invite packet to the SIP server that the device has registered.

At step 314, after the call is connected, the CODEC 202 in the VoIP controller digitizes the analog audio signal received from the telephone and the CPU 206 stores the digitized stream in the payload of Real Time Protocol (RTP) data packets. The RTP packets are a type of User Datagram Protocol (UDP) packet. The RTP data packets are sent over the DSL-enabled telephone line or other broadband Internet connection to a PSTN gateway, which converts the packets to PSTN format and forwards the resulting signal to the caller over the PSTN. The RTP packets are transmitted to the callee associated with the dialed number over the Internet instead of over the telephone network. There is a similar reverse flow of packets from the callee to the caller.

At step 316, while the call is connected, the VoIP controller monitors the status of the call to determine when to terminate the call. After the call is terminated by the caller or callee, the VoIP enable signal is typically reset to "not enabled" unless VoIP-only mode is selected.

Figure 4:
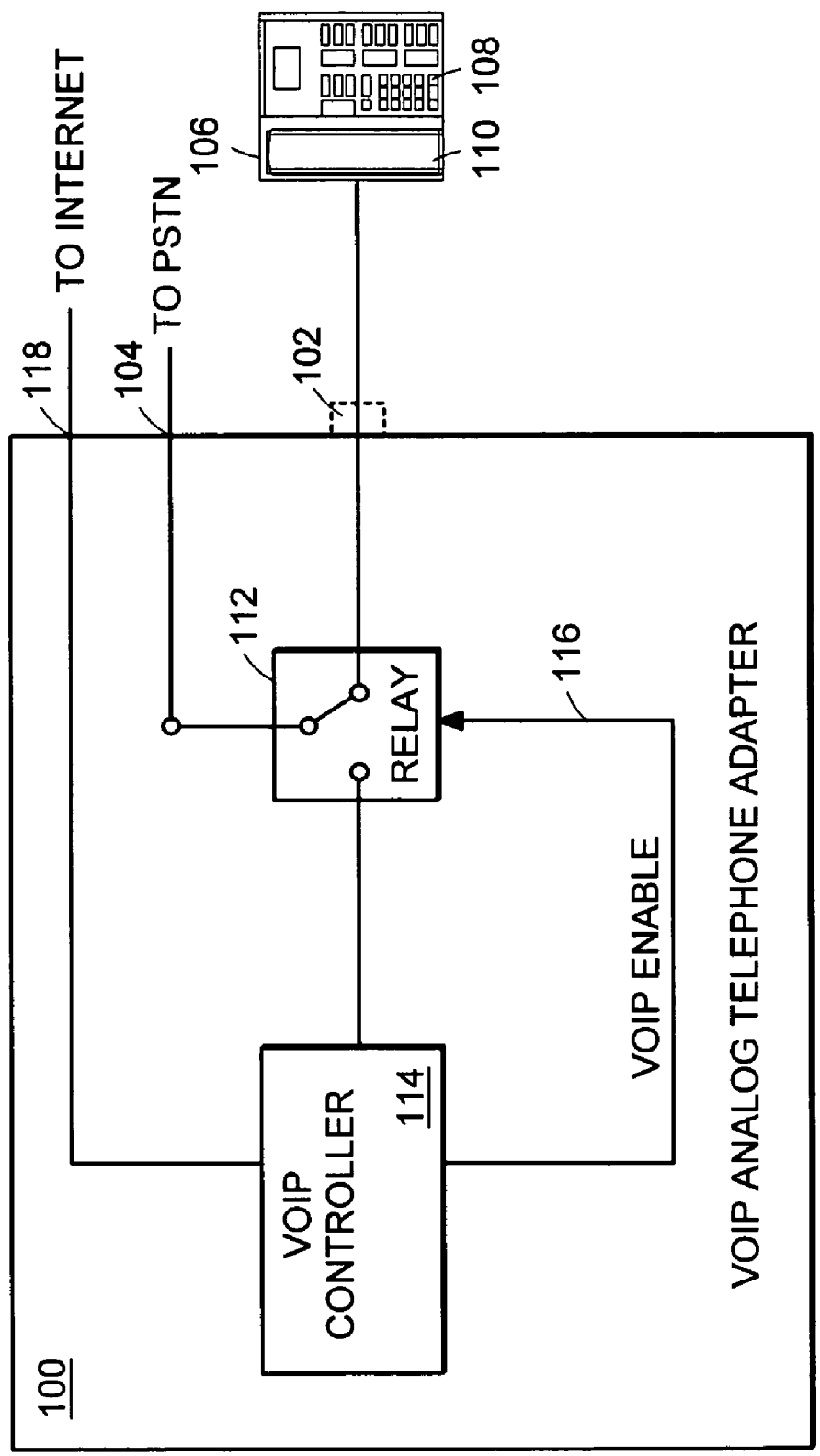
FIG. 4 is a block diagram of an alternate embodiment of the VoIP analog telephone adapter.

The invention has been described for an embodiment in which the RTP packets are transmitted over a DSL-enabled telephone line. FIG. 4 is a block diagram of an alternate embodiment, in which the RTP packets can be transmitted over a broadband network 118 through an Ethernet connection to an Internet connection such as a cable modem or DSL modem. In one embodiment, analog audio signals are received from the telephone device and transmitted in the form of RTP packets over the IP network or directly over the telephone network through the central office. The relay 112 directs the call to the Public Switched Telephone Network (PSTN) or to the VoIP controller for conversion to digital data prior to transmission in the payload of RTP packets over the broadband network. Port 104 connects to a standard telephone line. Port 118 connects to the Ethernet port of, for example, a cable modem or DSL modem.

Figure 5:
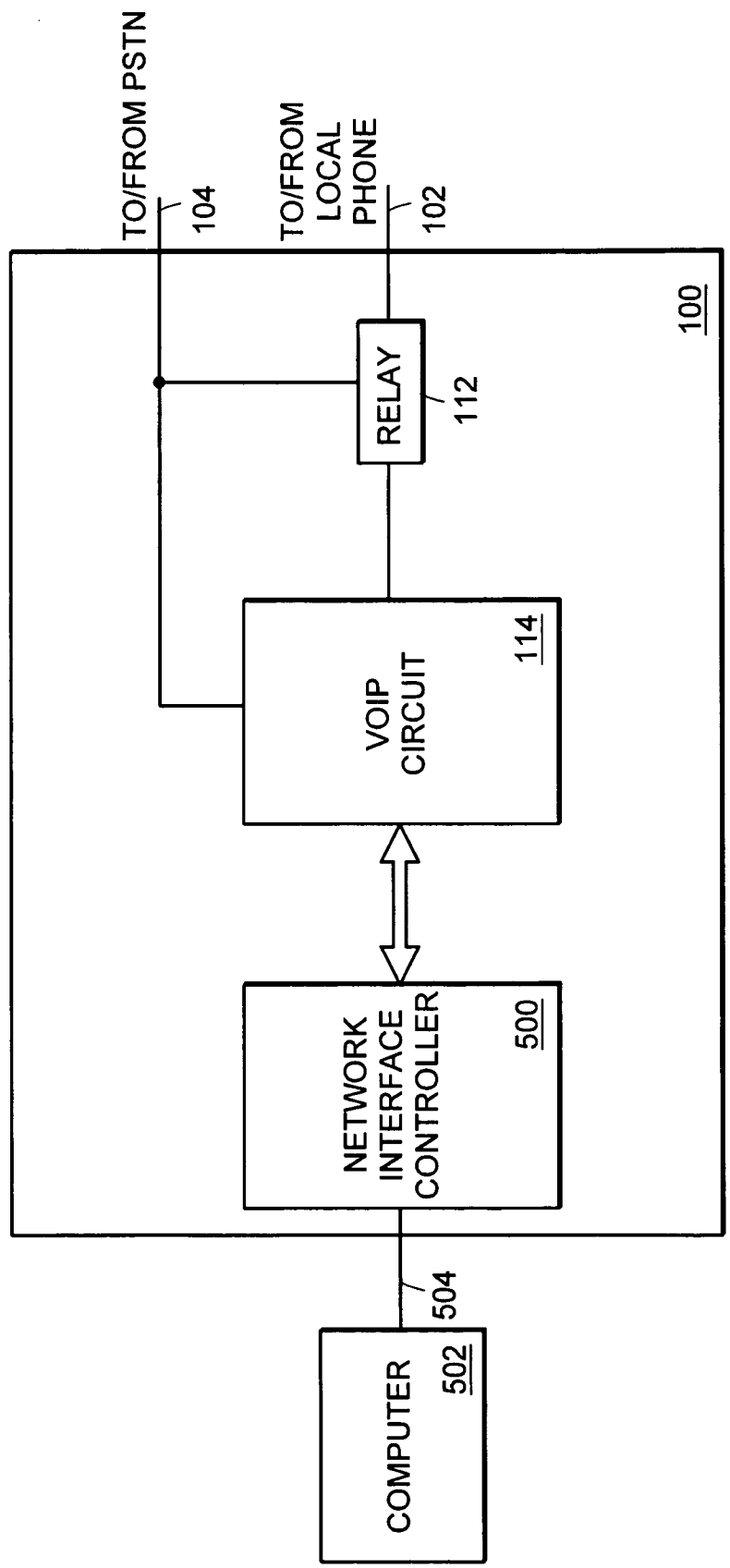
FIG. 5 is a block diagram of the VoIP analog telephone adapter shown in FIG. 1 with a computer connected to the adapter for configuring the adapter.

FIG. 5 is a block diagram of the adapter 100 shown in FIG. 1 with a computer 402 coupled to the adapter 100 for configuring the adapter. The computer 502 can be, for instance, any personal computer well-known to those skilled in the art that includes a microprocessor, memory, keyboard, monitor and a network interface controller for interfacing to the adapter 100. In one embodiment the computer 502 communicates with the adapter over a packet network 504 using an Ethernet protocol. In an alternative embodiment, the computer communicates with the adapter over the network 404 using the Universal Serial Bus protocol. For example, in an embodiment in which the digitized audio stream is transmitted over a DSL-enabled telephone connection, the computer 502 is used to configure the VPI/VCI numbers assigned by the service provider to the adapter. However, in an alternate embodiment, configuration may be performed using other means, for example, using the telephone keypad and display of the local telephone 106.

The configuration information is entered through a user interface that can be displayed on the computer's monitor. After the configuration information has been entered it is saved in non-volatile memory, for example, flash memory in the adapter.

FIG. 6 is a page 650 displayed on the monitor of the computer 402 for configuring VoIP in the adapter 100 shown in FIG. 4.

The registration status 602 indicates whether the adapter is registered with a VoIP service provider, and if not, the last registration step that was completed. The User ID 604 is the number assigned by a VoIP service provider. This number is typically the same as the VoIP number assigned to the adapter. The Auto-configuration status 606 indicates whether the adapter has received automatic account configuration information from the VoIP service provider. The World Wide Number 608 is a Direct Inward Dialing (DID) number that can be used to call the telephone connected to the adapter on the VoIP connection from the PSTN. The server 610 is the IP address or Uniform Resource Locator (URL) of the VoIP service's Trivial File Transfer Protocol (TFTP) server. The Filename 612 is the name of the configuration file for the adapter on the TFTP server. The encryption selection box 616 is checked if the service provider supports encryption of the downloaded configuration file. The display name 618 is the text to be transmitted as the caller identifier when a VoIP call is placed. The Select Tone & Ring by Country/Region 620 allows the adapter to be customized for ring and dial tone based on country and region. Download configuration now 622 is selected to initiate a download of updated account information from the service provider. VoIP only mode 624 allows the adapter to be configured so that all calls originating from the local phone connected to the adapter are directed through the VoIP controller. While the adapter is configured for VoIP only, all calls made from the local phone can be automatically directed through the Internet without the need for the caller to hit the '#' key prior to making the call.

In the embodiment described, the adapter is configured in conventional telephone mode and is switched to VoIP mode upon request of the caller. In an alternate embodiment, the adapter can be configured for VoIP-only mode. In VoIP only mode, the only dial tone is the distinctive dial tone generated by the Digital Signal Processor after the SLIC has detected that the telephone is "off-hook". There is no dial tone from the Central Office because the telephone is not connected through the relay to the central office.

While this invention has been particularly shown and described with references to preferred embodiments thereof, it will be understood by those skilled in the art that various changes in form and details may be made therein without departing from the scope of the invention encompassed by the appended claims.

What is claimed is:

1. An analog telephone adapter comprising:
    circuitry that encodes an analog voice signal into digital packets for transmission over a packet network; and
    a tone generator that, responsive to an off-hook condition, generates a distinctive dial tone, different than a standard telephone network dial tone, indicating that a connection will be directed to the packet network.

2. The adapter of claim 1, further comprising:
    other circuitry that directs a request for establishing the connection received from a telephone coupled to the adapter to a telephone network or to the packet network.

3. The adapter of claim 2 further comprising:
    a configuration manager that determines whether the circuitry directs the request to the telephone network or the packet network.

4. The adapter of claim 3, wherein the configuration manager is a web-sewer in the adapter.

5. The adapter of claim 3, wherein the configuration manager is an Interactive Voice Response in the adapter.

6. The adapter of claim 2, wherein the other circuitry directs the connection to the packet network upon detecting a signal from the telephone, and otherwise directs the connection to the telephone network.

7. The adapter of claim 6, wherein the tone generator generates the distinctive dial tone upon detection of the signal from the telephone.

8. The adapter of claim 7, wherein the signal the DTMF tone # from the telephone as the first DTMF tone detected after detection of the off-hook condition.

9. The adapter of claim 2, wherein the other circuitry directs the connection to the telephone network upon detecting a signal from the telephone, and otherwise directs the connection to the packet network.

10. The adapter of claim 9, wherein the tone generator generates the distinctive dial tone upon detection of the off-hook condition.

11. The adapter of claim 10, wherein the signal is the DTMF tone-# as the first tone detected after detection of the off-hook condition.

12. The adapter of claim 2, wherein the other circuitry always directs the request to the packet network.

13. The adapter of claim 12, wherein the tone generator generates the distinctive dial tone upon detection of the off-hook condition.

14. The adapter of claim 1, wherein the distinctive dial tone has a single frequency.

15. The adapter of claim 1, wherein the distinctive dial tone has at least two frequencies.

16. The adapter of claim 1, wherein the distinctive dial tone is continuous.

17. The adapter of claim 1, wherein the distinctive dial tone is discontinuous.

18. The adapter of claim 1, wherein the adapter connects to the Public Switched Telephone Network.

19. The adapter of claim 1, wherein DSL service is enabled for the adapter.

20. The adapter of claim 1, wherein the packet network is the Internet.

21. A method for identifying a requested connection at an analog telephone adapter, the method comprising:
    encoding an analog voice signal into a digital packet for transmission over a packet network; and
    responsive to an off-hook condition, generating a distinctive dial tone, different than a standard telephone network dial tone, indicating that the connection will be directed to the packet network.

22. The method of claim 21, wherein a request for establishing the connection, received from a telephone coupled to the adapter, is directed to a telephone network or to the packet network.

23. The method of claim 22 further comprising:
    determining, by a configuration manager whether the request is directed to the telephone network or the packet network.

24. The method of claim 23, wherein the configuration manager is a web-server in the adapter.

25. The method of claim 23, wherein the configuration manager is an Interactive Voice Response in the adapter.

26. The method of claim 22, wherein the connection is directed to the packet network upon detecting a signal from the telephone, and otherwise directed to the PSTN.

27. The method of claim 26, wherein the distinctive dial tone is generated upon detection of the signal.

28. The method of claim 27, wherein the signal is the DTMF tone # as the first DTMF tone detected after detection of an off-hook condition.

29. The method of claim 22, wherein the connection is directed to the telephone network upon detecting a signal from the telephone, and otherwise directed to the packet network.

30. The method of claim 29, wherein the distinctive dial tone is generated upon detection of the off-hook condition.

31. The method of claim 30, wherein the signal is the DTMF tone # as the first tone detected after detection of the off-hook condition.

32. The method of claim 22, wherein the request is always directed to the packet network.

33. The method of claim 32, wherein the distinctive dial tone is generated upon detection of the off-hook condition.

34. The method of claim 21, wherein the distinctive dial tone has a single frequency.

35. The method of claim 21, wherein the distinctive dial tone has at least two frequencies.

36. The method of claim 21, wherein the distinctive dial tone is continuous.

37. The method of claim 21, wherein the distinctive dial tone is not continuous.

38. The method of claim 21, wherein the adapter connects to the Public Switched Telephone Network.

39. The method of claim 21, wherein DSL service is enabled for the adapter.

40. The method of claim 21, wherein the packet network is the Internet.

41. An analog telephone adapter comprising:
    means for encoding an analog voice signal into a digital packet for transmission over a packet network; and
    responsive to an off-hook condition, means for generating a distinctive dial tone, different than a standard telephone network dial tone, indicating that a connection will be directed to the packet network.

* * * * *

UNITED STATES PATENT AND TRADEMARK OFFICE
CERTIFICATE OF CORRECTION

PATENT NO.       : 7,593,389 B2                                                Page 1 of 1
APPLICATION NO.  : 10/934787
DATED            : September 22, 2009
INVENTOR(S)      : William Hume Vance It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1417 days.

Signed and Sealed this

Twenty-first Day of September, 2010

David J. Kappos
*Director of the United States Patent and Trademark Office*